United States Patent [19]

Nacman

[11] Patent Number: 5,212,570
[45] Date of Patent: May 18, 1993

[54] PIXEL CLOCK PHASE LOCKED LOOP FOR A LASER SCANNER

[75] Inventor: Aron Nacman, Rochester, N.Y.

[73] Assignee: Xerox Corporation, Stamford, Conn.

[21] Appl. No.: 722,411

[22] Filed: Jun. 27, 1991

[51] Int. Cl.$^5$ .............................................. H04N 1/04
[52] U.S. Cl. .................... 358/481; 358/412; 358/474; 307/269
[58] Field of Search .............. 358/481, 474, 412, 208; 307/269

[56] References Cited

U.S. PATENT DOCUMENTS

| | | | |
|---|---|---|---|
| 3,867,571 | 2/1975 | Starkweather et al. | 358/481 |
| 4,204,233 | 5/1980 | Swager | 358/481 |
| 4,257,053 | 3/1981 | Gilbreath | 346/108 |
| 4,270,131 | 5/1981 | Tompkins et al. | 358/481 |
| 4,349,847 | 9/1982 | Traino | 358/471 |
| 4,571,623 | 2/1986 | Schoon | 358/208 |
| 4,587,531 | 5/1986 | Dangler | 358/481 |
| 4,635,000 | 1/1987 | Swanberg | 358/481 |
| 4,663,523 | 5/1987 | Swanberg | 358/208 |
| 4,677,292 | 1/1987 | Shimada | 358/481 |
| 4,729,617 | 3/1988 | Shimada et al. | 358/208 |
| 4,920,430 | 4/1990 | Isono et al. | 358/481 |
| 4,962,981 | 10/1990 | Murakami et al. | 358/481 |
| 5,164,843 | 11/1992 | Swanberg | 358/474 |

FOREIGN PATENT DOCUMENTS 0240232 10/1987 European Pat. Off. .

OTHER PUBLICATIONS

"Scan Correction for High-Speed Laser Printers", IBM Technical Disclosure Bulletin, vol. 32, No. 9A, Feb. 1990, pp. 343-344.

Primary Examiner—Edward L. Coles, Sr.
Assistant Examiner—Fan Lee
Attorney, Agent, or Firm—Oliff & Berridge

[57] ABSTRACT

A pixel clock phase locked loop for a laser scanner having a rotating multi-faceted polygon receives start-of scan and end-of-scan pulses for each of a plurality of scan lines. A voltage-controlled oscillator outputs a desired frequency of the pixel clock. A desired number of pixels in each scan line is counted, and a pulse is output at the last pixel in the scan line. The end-of-scan pulse and the last pixel pulse are compared, and an output is provided of phase error, the phase error being equal to the difference between the end-of-scan pulse and the last pixel pulse. The phase error for a facet of the polygon is utilized when the facet scans an imaging beam on a next subsequent polygon revolution. The phase error is converted to a voltage, and the phase error voltage is added to a center frequency voltage to generate a composite voltage for controlling the voltage-controlled oscillator.

16 Claims, 7 Drawing Sheets

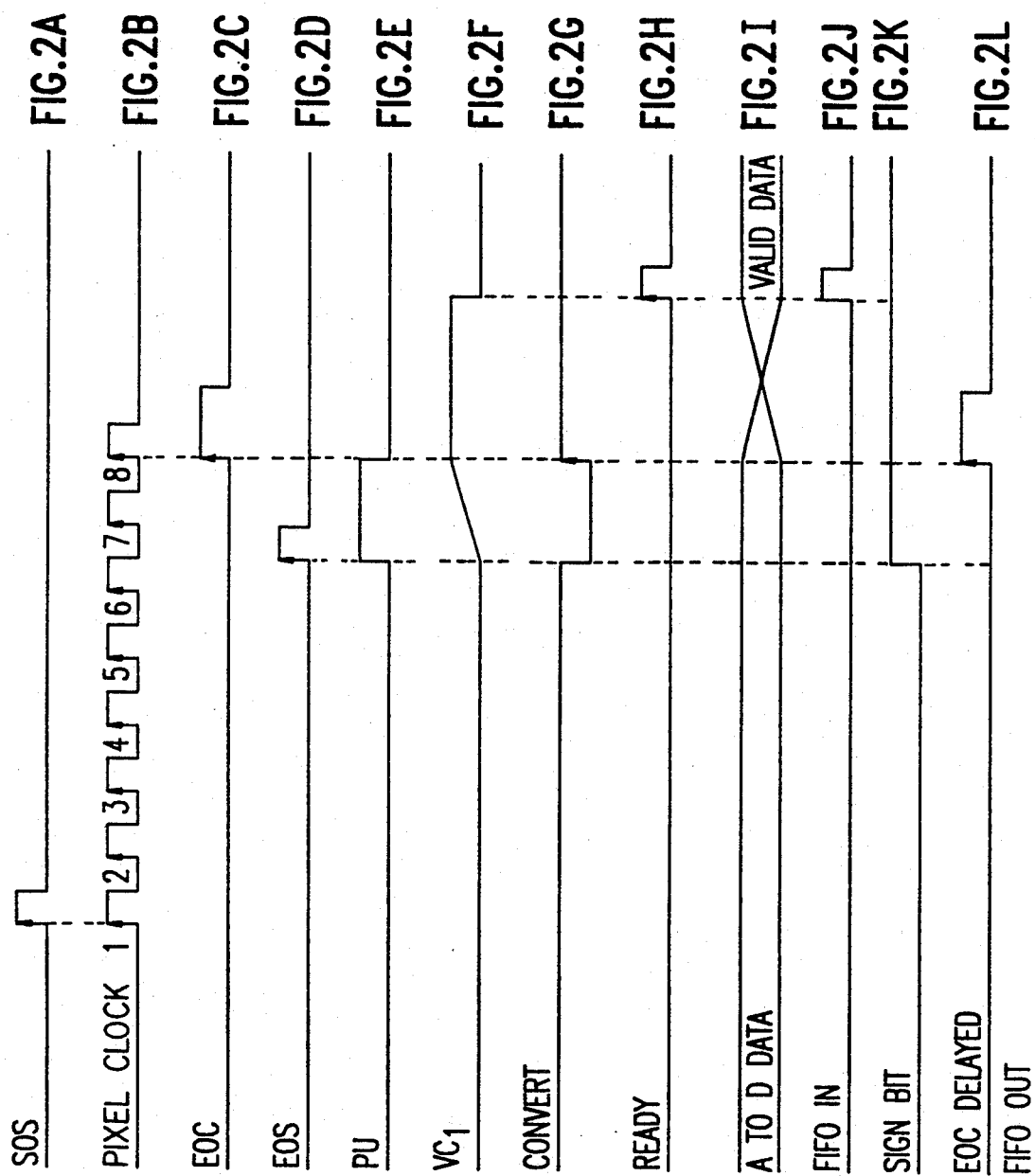

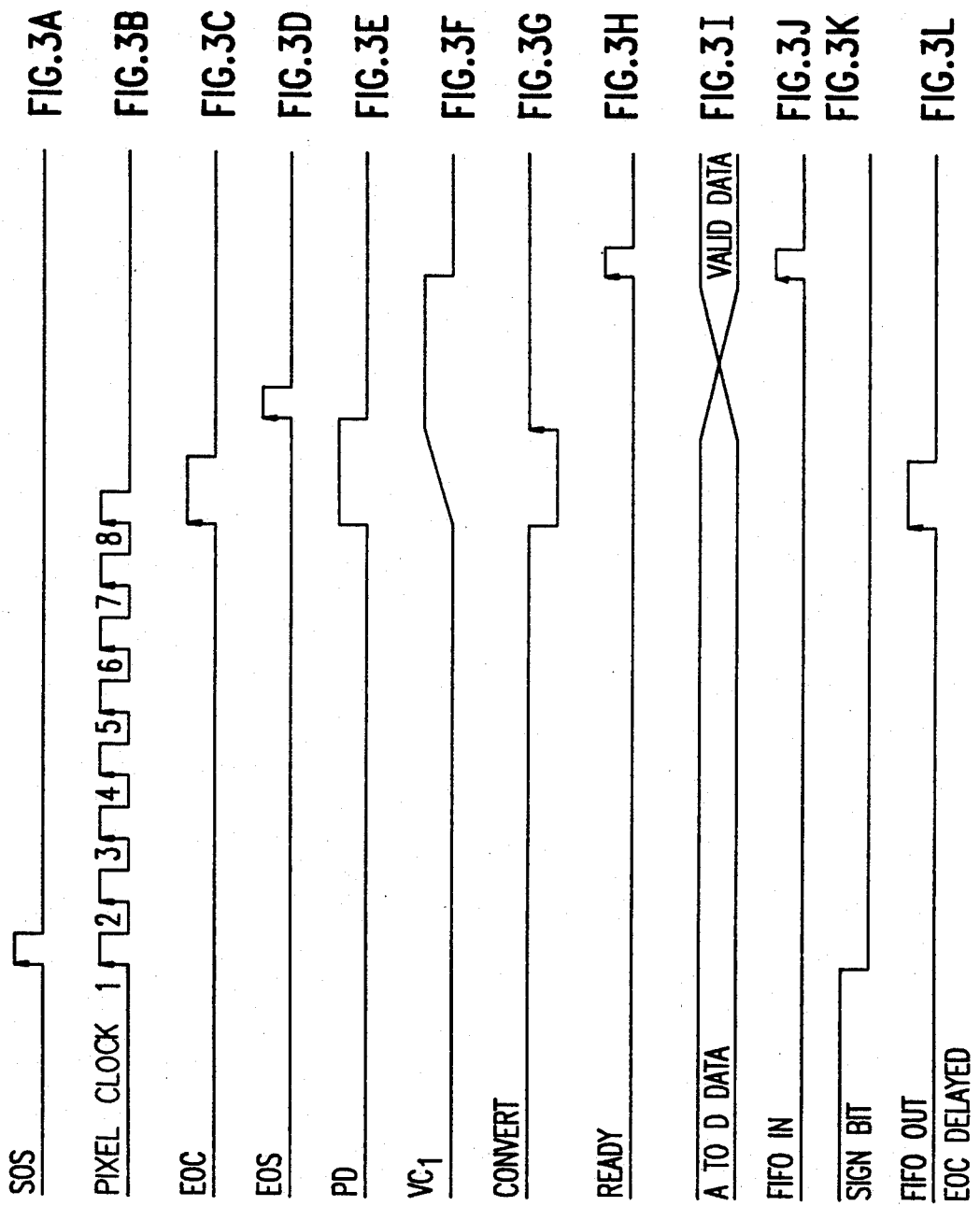

FACET #1

EOC DELAYED

FACET #2

EOC DELAYED

FACET #3

EOC DELAYED

FACET #4

EOC DELAYED

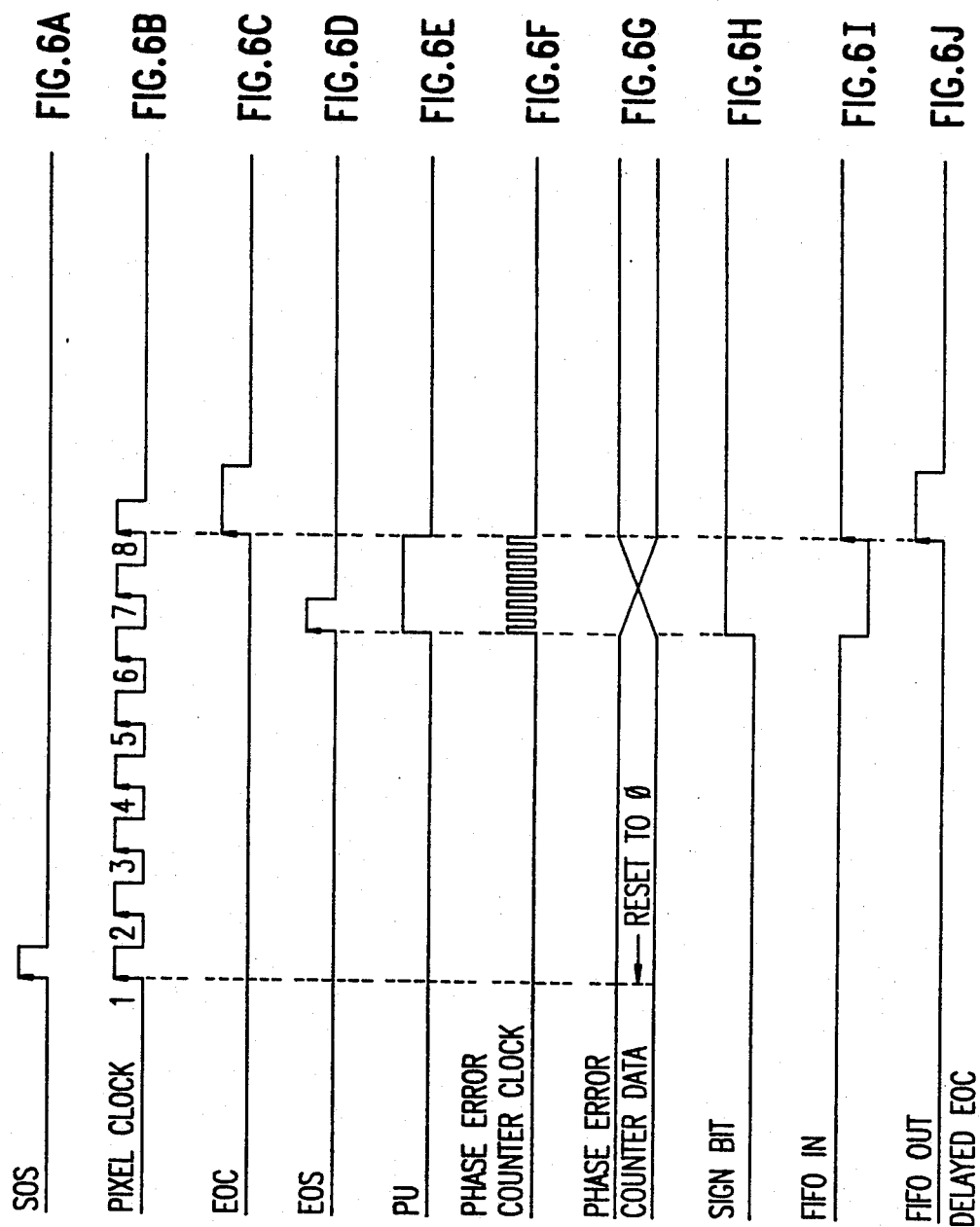

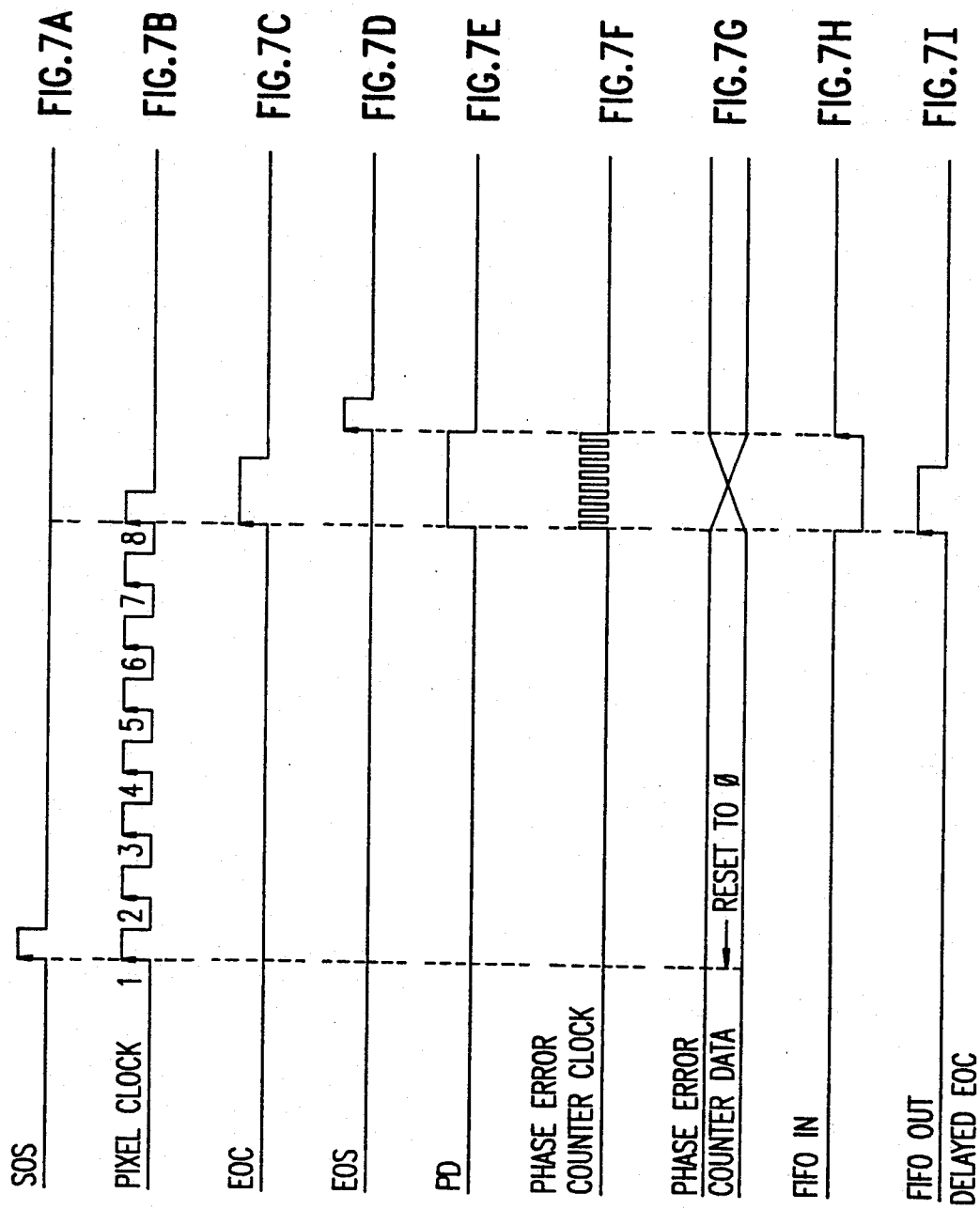

PIXEL CLOCK PHASE LOCKED LOOP FOR A LASER SCANNER

BACKGROUND OF THE INVENTION

1. Field of the Invention

The present invention relates to a pixel clock phase locked loop for a laser scanner and, more particularly, to a pixel clock phase locked loop which compensates for low frequency motor hunting, polygon motor cogging and facet jitter.

2. Description of the Related Art

A laser scanner such as a raster output scanner is used to transmit image information to an imaging surface such as a recording medium. A light source, such as a laser light source, generates a light beam which is modulated in accordance with image information contained in video image signals or pixels. The modulated light beam is applied to a rotating, multi-faceted polygon which scans the modulated light beam across the image plane of the imaging surface. Each facet of the polygon is mirrored. The polygon is spun by a motor, the motor speed controlling image resolution in the direction of movement of the imaging surface (i.e., the Y-direction). Image resolution within a scan line (i.e., the X-direction) is a function of the image signal or pixel rate. The resolution in the direction of scan is determined by the image signal or pixel clock frequency. Each mirrored facet of the polygon provides image information corresponding to one horizontal scan line.

Motor speed errors often occur at different frequencies which cause image distortion in the scan line direction. These errors include motor hunting in which the speed of the motor which spins the polygon changes slightly at a low frequency, e.g., less than 10 Hertz, motor cogging which is a motor aberration occurring at a motor cogging frequency equal to the number of motor poles multiplied by the number of revolutions per second, and facet jitter which is a motor aberration occurring at every scan line, i.e., every facet. Particularly when color printing is being performed and pixels must be registered for each of a plurality of separations, it is critical for pixel registration to be accurate to prevent distorted, blurred images from resulting. Errors also occur in individual polygon facets such as differences in radius and angularity of each facet of the polygon. These errors also distort the resulting image.

Different techniques have been developed for correcting such errors. One of these techniques includes the use of a pixel clock phase locked loop. Such phase locked loops have, for example, been used to generate pixel clock pulses at a frequency which is a function of polygon velocity, the phase locked loop monitoring variations in the polygon velocity and adjusting the clock frequency to maintain image size constant in the direction of the scan line. These phase locked loops are typically designed to compensate for the relatively low frequency motor hunting. Known phase locked loops correct the fast scan line based on previous scan line error. Facet jitter, however, is unique to each facet. Accordingly, previously scan line error is the wrong error information to be used for correction in the next scan line. A pixel phase locked loop which corrects for varying frequencies of error is thus desirable.

U.S. Pat. No. 4,204,233, to Swager, assigned to Xerox Corporation, discloses a system for correcting a facet error which changes the rate of a bit clock based on errors of individual facets of a rotating polygon. At the time of a start-of-scan signal, a bit clock counter is initiated. The error for a particular facet is determined by the interval between a scan line bit count output and an end-of-scan output. The facet error is represented by a binary number corresponding to the interval. The error for a particular facet is stored in a memory location corresponding to that facet. When the facet is utilized, the error previously stored in the memory location for that facet is used to control an oscillator so that the output frequency corresponds to the frequency required to compensate for velocity errors caused by that facet. After the facet is scanned, the error signal previously stored in memory for that facet is updated. During the time between the end-of-scan signal and the start-of-scan signal for a scan line, the error for the next facet is read out of memory. Because the pixel clock is itself used to measure, or count, the error, the reference allows only an accuracy to within plus or minus one pixel clock per scan line. Thus, if used in conjunction with a typical pixel clock which runs up to a maximum of 100 MHz, the accuracy to which error correction can be achieved equates to only within plus or minus 10 nanoseconds correction per scan line.

U.S. Pat. No. 4,270,131 to Tompkins et al discloses a system for electronically correcting for errors in a laser scanner. Corrections are provided for each facet of a spinner mirror and are stored in random access memories until the same mirror again reflects a laser beam across a photosensitive drum. After several spinner revolutions, the random access memory is stabilized. The start-of-scan signal is used to locate all of the facets at the beginning of each scan line along a vertical line. There is no correction for errors attributed to different frequencies of motor speed.

U.S. Pat. No. 4,257,053 to Gilbreath discloses a laser graphics plotter for plotting data on a recording medium as selectively positioned pixels of variable intensity. A spot placement means is provided to generate a spot placement signal which cooperates with plot data to modulate the laser beam. The spot placement means provides error correction for facet-to-facet and facet-to-axis errors in the rotating mirror to permit high resolution plotting on wide format film. The device compensates only for manufacturing tolerances.

U.S. Pat. No. 4,349,847 to Traino, assigned to Xerox Corporation, discloses a raster output scanner having a movable imaging member and imaging beam for exposing the imaging member to create images thereon. A rotating polygon scans the beam across the imaging member in line-by-line fashion while the beam is modulated in accordance with pixels input thereto. A clock provides clock pulses for clocking the image pixels to the modulator. The polygon velocity is controlled to maintain a predetermined velocity relationship between the imaging member and polygon. Accordingly, the device compensates only for velocity variations.

U.S. Pat. No. 3,867,571 to Starkweather et al, assigned to Xerox Corporation, discloses a flying spot scanning system which utilizes reflected light from a multi-faceted rotating polygon. In each scanning cycle, information is transmitted to a scanned medium by modulating light from a light source in accordance with a video signal. To assure a uniform spot size at the scanned medium, an optical convolution of elements is selected in combination with the light source. The rotation of the polygon is synchronized in phased relation to the scan rate used to obtain the video signal. The device provides no compensation for motor speed error at different frequencies.

While the related art attempts to compensate for various errors affecting pixel registration, the art does not compensate for errors occurring at various frequencies of motor speed such as motor hunting, polygon motor cogging and facet jitter.

OBJECTS AND SUMMARY OF THE INVENTION

An object of the present invention is to provide a phase locked loop for controlling a pixel clock which compensates for motor errors occurring at a variety of frequencies.

Another object of the present invention is to provide a phase locked loop for controlling a pixel clock by correcting for errors associated with each facet of a multi-faceted rotating polygon.

Another object of the present invention is to provide a phase locked loop for controlling a pixel clock which operates in an on-going manner.

A further object of the present invention is to provide an economical, accurate phase locked loop for controlling a pixel lock.

To achieve the foregoing and other objects and to overcome the shortcomings discussed above, a pixel clock phase locked loop for a laser scanner is provided which receives start-of-scan and end-of-scan pulses for each of a plurality of scan lines. The laser scanner includes a rotating, multi-faceted polygon, each facet of the polygon being mirrored. A voltage controlled oscillator outputs a desired frequency of the pixel clock. A desired number of pixels in each scan line is counted, and a pulse is output at the last pixel of the scan line. The end-of-scan pulse and the last pixel pulse are compared, and an output is provided of phase error, the phase error being equal to the difference between the end-of-scan pulse and the last pixel pulse. The phase error for a particular facet of the polygon is utilized when the facet scans an imaging beam on a next subsequent polygon revolution. The phase error is converted to a phase error voltage which is added to a center frequency voltage to generate a composite voltage, the composite voltage controlling the voltage controlled oscillator.

BRIEF DESCRIPTION OF THE DRAWINGS

The invention will be described in detail with reference to the following drawings in which like reference numerals refer to like elements, and wherein:

FIGS. 2A-2L illustrate timing diagrams of a pump-up cycle according to the FIG. 1 embodiment;

FIGS. 3A-3L illustrate timing diagrams of a pump-down cycle according to the FIG. 1 embodiment;

FIGS. 6A-6J illustrate timing diagrams of a pump-up cycle according to the FIG. 5 embodiment; and FIGS. 7A-7I illustrate timing diagrams of a pump-down cycle according to the FIG. 5 embodiment.

DETAILED DESCRIPTION OF THE PREFERRED EMBODIMENTS

Figure 1:
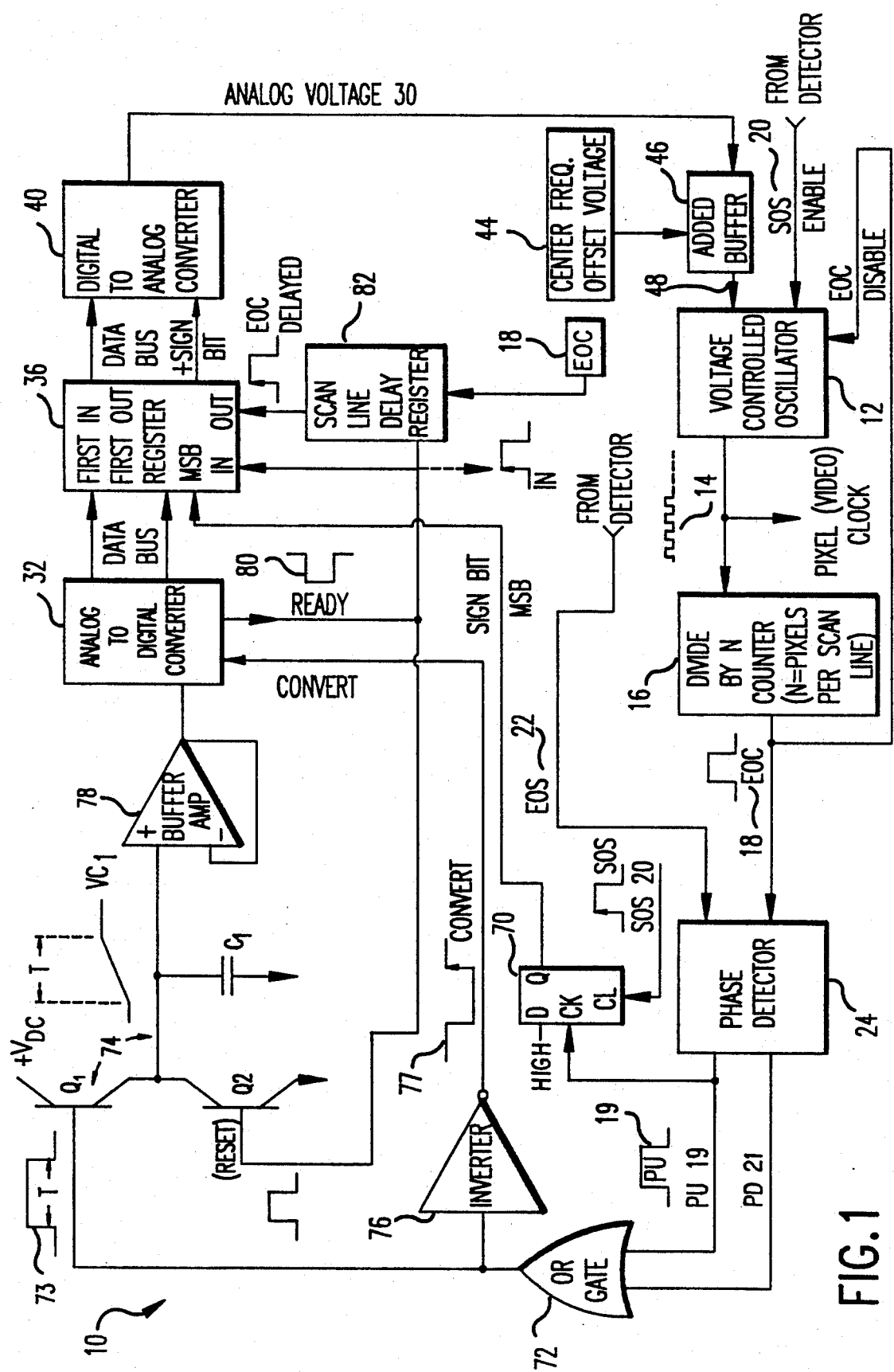
FIG. 1 is a block diagram of a first embodiment of a pixel clock phase locked loop of the present invention.

Referring now to the drawings, and particularly to FIGS. 1, 2A-2L, 3A-3L and 4A-4P, thereof, a pixel clock phase locked loop 10 is described. Phase locked loop 10 includes a voltage controlled oscillator 12 which outputs a desired pixel (video) clock frequency 14. A detector such as that described in U.S. Pat. No. 3,867,575 generates a start-of-scan (SOS) signal pulse 20 and an end-of-scan (EOS) signal pulse 22 to indicate the start and end, respectively, of a scan line. The rising edge of the SOS pulse enables the voltage-controlled oscillator 12. A counter such as a divide-by-N counter 16 receives the desired pixel clock frequency and counts the number of pixels desired in a fast scan line. Counter 16 then outputs a signal called an "end of count" (EOC) pulse 18 at the last pixel in the scanned line. The EOC pulse 18 disables the voltage-controlled oscillator 12.

The EOS pulse 22 and the EOC pulse 18 are input to phase detector 24. The EOS pulse 22 is the reference to which phase locked loop attempts to lock, while the EOC pulse 18 is a measure of the frequency of voltage-controlled oscillator 12. The phase detector 24 compares the end of count pulse 18 and the end-of-scan pulse 22 to determine phase error therebetween. If a phase error is detected, the voltage-controlled oscillator 2 is not operating at the proper frequency. Phase detector 24 outputs a pulse 26 having a pulse width equal to the determined phase error, i.e., the difference in time between the rising edges of the EOS pulse 22 and the EOC pulse 18 as the pulses arrive at phase detector 24.

If the EOS pulse 22 arrives at phase detector 24 before the EOC pulse 18, an indication is made that voltage-controlled oscillator 12 is operating at too low a frequency. Accordingly, it is necessary to increase, or pump up, the frequency of voltage-controlled oscillator 12 to correct the error PU 19 output from phase detector 24.

The error pulse PU 19 has a rising edge which clocks a flip flop 70 so that the sign bit output will go high, indicating a pump up condition. Flip flop 70 is cleared by a SOS signal 20.

The error pulse PU 19 and an error pulse pump down (PD) 21 (to be discussed hereinafter), are input to OR gate 72. The pulse 73 output from OR gate 72 has a pulse width which drives integrator 74 (Q1 and C1), while pulse 73 is inverted by inverter 76 to drive analog-to-digital converter 32 by a convert signal 77.

Pulse 73 drives transistor Q1, which is preferably a bipolar or a field effect transistor, so that transistor Q1 is conducting for a time period T equal to the pulse width. Since transistor Q2 is off, capacitor C1 charges for a time period T equal to the pulse width. The final voltage VC1 to which capacitor C1 charges is proportional to pulse width T.

A buffer amplifier 78 drives the voltage VC1 on capacitor C1 into analog-to-digital converter 32. The rising edge of inverted pulse 77 signals analog-to-digital converter 32 to convert the buffered C1 voltage. When the conversion is complete, analog-to-digital converter 32 outputs a ready pulse 80. Ready pulse 80 has a rising edge which clocks digital data from analog to digital converter 32 into a first-in first-out (FIFO) register 36. Ready pulse 80 also resets the voltage on capacitor C1 to zero by driving transistor Q2 into saturation. As ready pulse 80 clocks the digital data into FIFO 36, ready pulse 80 further clocks the state of the sign bit into FIFO 36. The digital data in FIFO 36 represents the phase error for the particular facet measured.

On the next revolution of the polygon, the digital data in FIFO 36 is converted into an analog phase error voltage 30 by a digital to analog converter 40. A center frequency voltage 44 and the phase error voltage 30 are added by an adder buffer 46 to generate a composite voltage 48. Composite voltage 48 is then used to control the voltage controlled oscillator 12 to output a pixel clock frequency which accurately compensates for frequencies of motor speed error occurring equal to or less than once per polygon revolution.

The EOC pulse 18 is delayed by scan line delay register 82 a number of scan lines equal to the number of polygon facets minus 1 so that the digital data is clocked out of FIFO 36 at the end of the scan line previous to the desired facet. Digital-to-analog converter 40 is thus provided the time to convert and settle during a time period when the voltage-controlled oscillator 12 is disabled, i.e., the time period between EOC pulse 18 and SOS pulse 20. When the SOS pulse 20 arrives at the voltage-controlled oscillator 12, the voltage-controlled oscillator 12 will be operating at the proper frequency for that particular facet.

FIGS. 2A-2L illustrate timing diagrams of the signals generated in phase locked loop 10 for a pump up cycle. In this example, there are only eight pixels in the line. Typically, however, there would be on the order of 2000 to 12000 pixels in a line.

In phase locked loop 10, if the EOS pulse 22 arrives at phase detector 24 after the EOC pulse 18, an indication is made that voltage-controlled oscillator 12 is operating at too high a frequency. Accordingly, it is then necessary to decrease, or pump down, the frequency of voltage-controlled oscillator 12 to correct the error PD 21. The pump down operation is similar to the pump up operation described above.

The error pulse PD 19 does not, however, clock flip flop 70. Accordingly, the sign bit does not go high. The remaining functions operate in the same manner as in the pump up cycle. FIGS. 3A-3L illustrate timing diagrams of the signals generated in phase locked loop 10 for a pump-down cycle.

Figure 4A:
FIGS. 4A-4P illustrate timing diagrams of scan line delay for a four-facet polygon used in conjunction with the FIG. 1 embodiment.
Figure 4B:
Figure 4C:
Figure 4D:
Figure 4E:
Figure 4F:
Figure 4G:
Figure 4H:
Figure 4I:
Figure 4J:
Figure 4K:
Figure 4L:
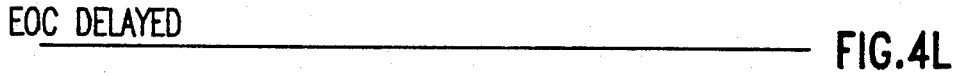
Figure 4M:
Figure 4N:
Figure 4O:
Figure 4P:
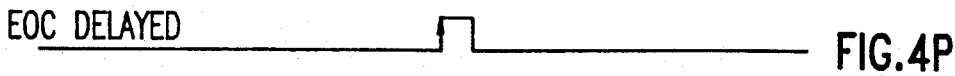

FIGS. 4A-4P illustrate the scan line delay for an exemplary four-faceted polygon.

The phase error for facet #1 is clocked into FIFO 36 on the rising edge of the ready pulse of FIG. 4C. The phase error for facets #2, #3 and #4 are stored on the rising edge of the ready pulses of FIGS. 4G, 4K and 4O, respectively. The phase error for facet #1 is retrieved at the rising edge of the EOC delayed pulse of FIG. 4P.

The EOC has been delayed three scan lines, i.e., the number of facets minus one. The phase error for facet #1 is now clocked out of FIFO 36 and is applied to voltage-controlled oscillator 12. When SOS signal 20 enables voltage-controlled oscillator 12 at the start of the sweep of facet #1, voltage-controlled oscillator 12 will be at the desired frequency. After the initial revolution of the polygon, FIFO 36 will constantly clock in the new phase error and clock out the phase error information from the previous revolution.

The accuracy of phase locked loop 10 is substantially within plus or minus 1 nanosecond correction per scan line. The increased accuracy obtained is essential to maintain registration in multiple color printing.

The phase locked loop 10 described above with respect to FIG. 1 requires the use of an integrator 74 which operates accurately and at high speed to transform narrow pulse widths provided by phase detector 24 into voltages for conversion and storage in FIFO 36.

Figure 5:
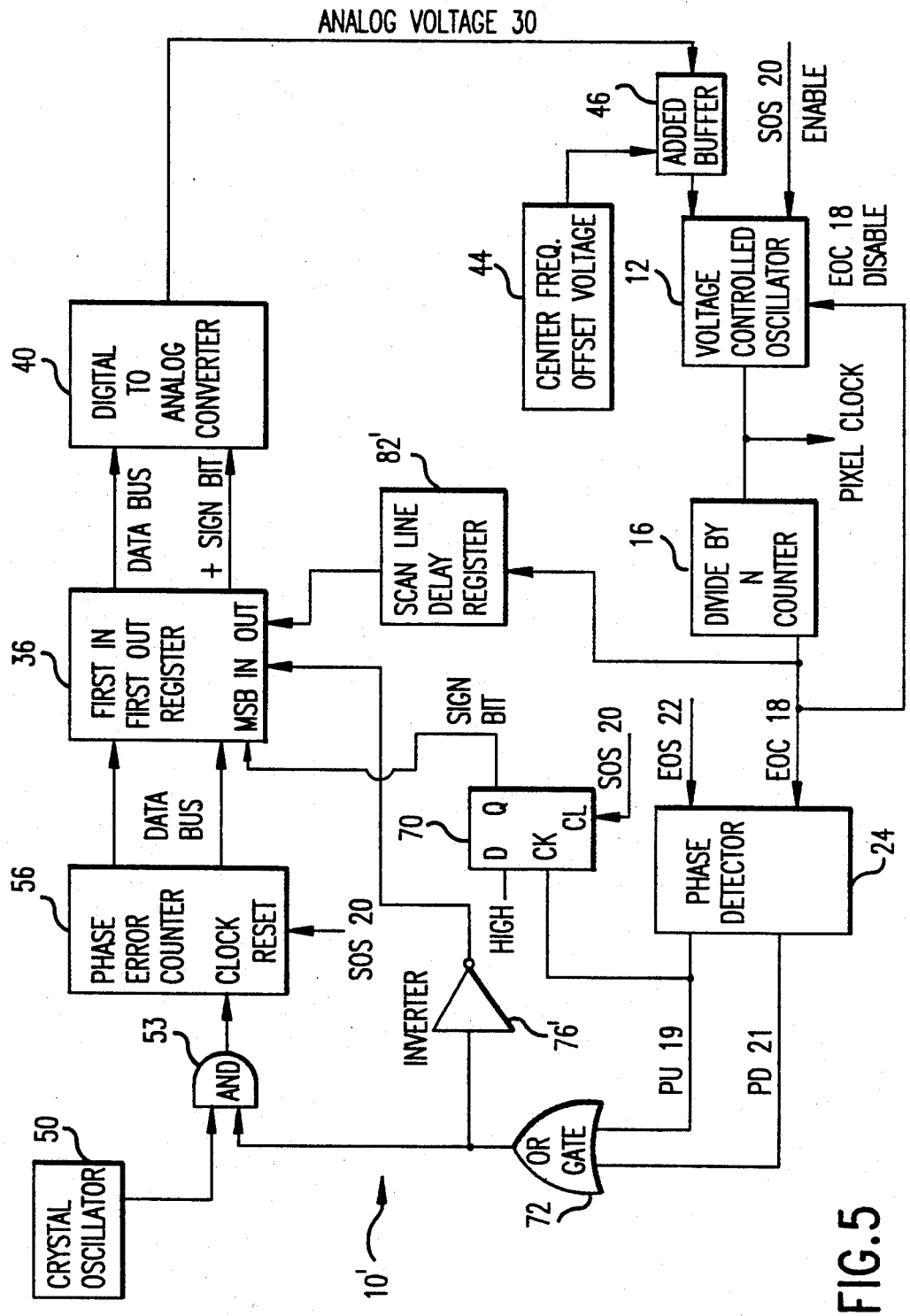
FIG. 5 is a block diagram of a second embodiment of a pixel clock phase locked loop according to the present invention.

FIG. 5 illustrates an alternative phase locked loop 10' which does not require integrator 74. In the phase locked loop 10' of FIG. 2, the rising edge of SOS signal 20 enables the voltage controlled oscillator 12 having an output frequency which is the pixel (video) clock frequency. The rising edge of SOS signal 20 also resets a phase error counter 56 to zero.

Divide-by-N counter 16 counts the number of pixels 16 in a fast scan line and, at the last pixel, outputs signal EOC 18. Signal EOC 18 disables voltage-controlled oscillator 12 and is also input to phase detector 24.

In the pump-up operation, as described above, the rising edge of PU signal 19 clocks flip flop 70 so that the sign bit output goes high. The SOS signal 20 clears flip flop 70. Signals PU 19 and PD 21 are input to OR gate 72. The pulse output from OR gate 72 enables a crystal oscillator 50 through AND gate 53 to clock phase error counter 56 for as many clock cycles as will fit into the pulse width. Phase error counter 56 thus outputs data proportional to the phase error pulse width.

The pulse output from OR gate 72 is also input to inverter 76'. The rising edge of the inverted phase error pulse clocks the data from phase error counter 56 into FIFO 36. The sign bit that is in the high state is also clocked in simultaneously. The digital data in FIFO 36 represents the phase error for the particular facet measured. The data is retrieved in the same manner as described above with respect to FIG. 1.

FIGS. 6A-6J and 7A-7I illustrate timing diagrams for signals generated in phase locked loop 10' for pump-up operation and pump-down operation, respectively. As in the previous example, these diagrams illustrate a line having only 8 pixels, while a typical system would generally have 200 to 12000 pixels in a line.

The accuracy of phase locked loop 10' is substantially within plus or minus 2 nanoseconds correction per scan line. The increased accuracy obtained is essential to maintain registration in multiple color printing.

Phase locked loop 10' simplifies the design of the phase locked loop while providing an increase in the signal to noise ratio.

The present invention thus provides a phase locked loop which stores the error for each facet and corrects the error for that same facet on a next subsequent revolution of the polygon. The use of a FIFO memory device enables memory access to be sequential, not random, thus simplifying the design. While the error for each facet is being corrected on the immediate scan, error information is being stored on the immediate scan for error correction on the next polygon revolution for the same facet. Accordingly, motor speed errors occurring at frequencies equal to or less than once per revolution can be accurately and economically compensated.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A laser scanner having a pixel clock, said scanner including a rotating multi-faceted polygon for scanning an imaging beam across an imaging member, each facet of said polygon scanning one of a plurality of scan lines, the pixel clock controlling image resolution within each scan line, the pixel clock including a phase locked loop comprising:

generating means for generating pulses indicative of each of the beginning and end of scanning for each scan line;

a voltage-controlled oscillator for outputting a desired frequency of the pixel clock;

counter means for counting a desired number of pixels in each scan line and outputting a pulse at a last pixel in the scan line;

comparison means for comparing said end of scanning pulse and said last pixel pulse, said comparison means outputting a phase error substantially equal to the difference between said end of scanning pulse and said last pixel pulse;

storage means for storing said phase error for each individual facet of said polygon;

clocking means for obtaining from said storage means said phase error for each said individual facet when the facet scans an imaging beam on a next subsequent revolution of said polygon;

transforming means for transforming said obtained phase error to a phase error voltage;

means for generating a center frequency voltage;

adding means for adding said phase error voltage to said center frequency voltage to generate a composite voltage; and control means for controlling said voltage controlled oscillator at said composite voltage, said phase locked loop providing an accuracy substantially of within ±2 nanoseconds correction per scan line.

2. The laser scanner according to claim 1, wherein said comparison means comprises a phase detector which creates a pulse having a pulse width indicative of said phase error.

3. The laser scanner according to claim 2, wherein said comparison means includes an integrator and an analog to digital converter, said integrator receiving said phase error pulse and transforming the pulse width of said phase error pulse into a voltage having an amplitude substantially proportional to the phase error, said analog to digital converter transforming the voltage proportional to the phase error to digital data corresponding to said phase error.

4. The laser scanner according to claim 3, further comprising a timing and control means responsive to said generating means, said timing and control means controlling said integrator to sample the phase error pulse for each each facet of said polygon.

5. The laser scanner according to claim 4, wherein said timing and control means controls said analog to digital converter to transform the voltage to digital data.

6. The laser scanner according to claim 5, wherein said timing and control means includes said clocking means, said timing and control means further controlling said storage means to store said digital data.

7. The laser scanner according to claim 2, further comprising an oscillator means for generating a clock signal, said comparison means including a counter, said phase error pulse width enabling said oscillator means to clock said counter during the phase error pulse width, said counter transforming said phase error pulse width to digital data corresponding to said phase error.

8. The laser scanner according to claim 7, further comprising a timing and control means, wherein said timing and control means resets said counter for transformation of said phase error pulse width to the digital data.

9. The laser scanner according to claim 8, wherein said timing and control means includes said clocking means, said timing and control means further controlling said storage means to store said digital data.

10. The laser scanner to claim 1, wherein said storage means comprises a first-in first-out register.

11. A laser scanner having a pixel clock, said scanner including a rotating multi-faceted polygon for scanning and imaging beam across an imaging member, each facet of said polygon scanning one of a plurality of scan lines, the pixel clock controlling image resolution within each scan line, the pixel clock including a phase locked loop comprising:

generating means for generating pulses indicative of each of the beginning and end of scanning for each scan line;

a voltage-controlled oscillator for outputting a desired frequency of the pixel clock;

counter means for counting a desired number of pixels in each scan line and outputting a pulse at a last pixel in the scan line;

comparison means comprising a phase detector which outputs a phase error pulse having a pulse width substantially equal to the difference between said end of scanning pulse and said last pixel pulse, said comparison means further comprising first transforming means for transforming the phase error pulse width to a digital word;

storage means for storing said phase error for each individual facet of said polygon;

supply means for supplying from said storage means said phase error for each said individual facet when the facet scans an imaging beam on a next subsequent revolution of said polygon;

second transforming means for transforming said supplied phase error to a phase error voltage;

means for generating a center frequency voltage;

adding means for adding said phase error voltage to said center frequency voltage to generate a composite voltage; and control means for controlling said voltage-controlled oscillator at said composite voltage, said phase locked loop providing an accuracy substantially of within ±2 nanoseconds per scan line.

12. The laser scanner according to claim 11, wherein said first transforming means comprises an integrator and an analog to digital converter, said integrator receiving said phase error pulse and transforming the pulse width of said phase error pulse into a voltage having an amplitude substantially proportional to the phase error, said analog to digital converter transforming the voltage proportional to the phase error to digital data corresponding to the phase error.

13. The laser scanner according to claim 12, further comprising a timing and control means responsive to said generating means, said timing and control means controlling said integrator to selectively sample the phase error pulse each facet of said polygon and controlling said analog to digital converter to transform the voltage to the digital data.

14. The laser scanner according to claim 11, further comprising an oscillator means for generating a clock signal, said first transforming means including a counter, said phase error pulse width enabling said oscillating means to clock said counter during the phase error pulse width, said counter transforming said phase error pulse width to digital data corresponding to phase error.

15. The laser scanner according to claim 14, further comprising a timing and control means which resets said counter for transformation of said phase error pulse width to a digital word, said timing and control means including said supply means, said timing and control means further controlling said storage means to store said digital data.

16. The laser scanner according to claim 11, wherein said storage means comprises a first-in first-out register.

* * * * *